(12) United States Patent
Droste et al.

(10) Patent No.: US 9,476,444 B2
(45) Date of Patent: Oct. 25, 2016

(54) ANTI-ROTATION AND PULL RESISTANT FASTENER INSERTS

(71) Applicant: FORD GLOBAL TECHNOLOGIES, LLC, Dearborn, MI (US)

(72) Inventors: Steve Droste, Ypsilanti, MI (US); Jesus Cardoso, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 53 days.

(21) Appl. No.: 14/451,483

(22) Filed: Aug. 5, 2014

(65) Prior Publication Data

US 2016/0040707 A1 Feb. 11, 2016

(51) Int. Cl.
F16B 37/04 (2006.01)
F16B 37/12 (2006.01)

(52) U.S. Cl.
CPC .................. F16B 37/122 (2013.01)

(58) Field of Classification Search
CPC ....... F16B 37/12; F16B 37/122; F16B 37/04
USPC ..................... 411/176, 180, 185, 187; 16/2.1
See application file for complete search history.

(56) References Cited

U.S. PATENT DOCUMENTS

| | | | |
|---|---|---|---|
| 737,407 A * | 8/1903 | Hirsch | B65H 75/10 16/2.1 |
| D157,484 S * | 2/1950 | Gade | 411/437 |
| 2,561,433 A * | 7/1951 | Uhle | B29D 1/00 351/140 |
| 2,785,726 A * | 3/1957 | Brush | F16B 37/122 411/16 |
| 2,949,142 A * | 8/1960 | Sumerak | F16B 37/122 29/432 |
| 3,204,679 A * | 9/1965 | Walsh | F16B 37/068 411/180 |
| 3,829,184 A * | 8/1974 | Chevret | F16C 11/04 16/2.1 |
| 4,603,071 A * | 7/1986 | Wehnert | B29C 70/347 16/2.1 |
| 4,842,462 A | 6/1989 | Tildesley | |
| 5,445,483 A | 8/1995 | Fultz | |
| 5,672,038 A | 9/1997 | Eaton | |
| 5,879,115 A * | 3/1999 | Medal | B29C 65/08 156/272.2 |
| 6,193,456 B1 * | 2/2001 | Stumpf | F16B 37/122 411/180 |
| 6,692,207 B1 | 2/2004 | Bailey | |
| 7,223,458 B2 * | 5/2007 | Tango | F16B 37/122 403/200 |
| 7,854,101 B2 | 12/2010 | Swayne et al. | |
| 8,561,742 B2 | 10/2013 | Pedret et al. | |
| 2008/0170928 A1 * | 7/2008 | Stadler | F16B 13/02 411/392 |
| 2008/0292425 A1 | 11/2008 | Pineiros et al. | |

* cited by examiner

*Primary Examiner* — Roberta Delisle
(74) *Attorney, Agent, or Firm* — Carlson, Gaskey & Olds

(57) ABSTRACT

An insert according to an exemplary aspect of the present disclosure includes, among other things, a body extending along an axis between a proximal portion and a distal portion and a plurality of tabs that protrude radially outwardly from an outermost surface of the body at a location between the proximal portion and the distal portion.

2 Claims, 5 Drawing Sheets

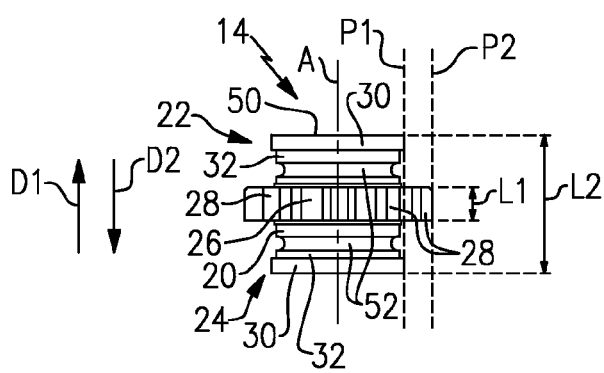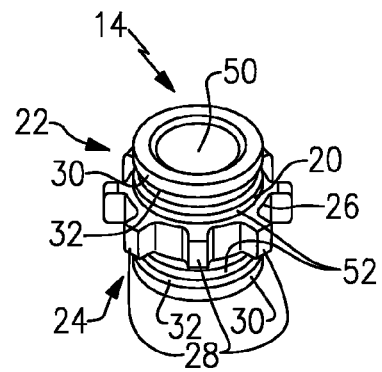
FIG.2A  FIG.2B
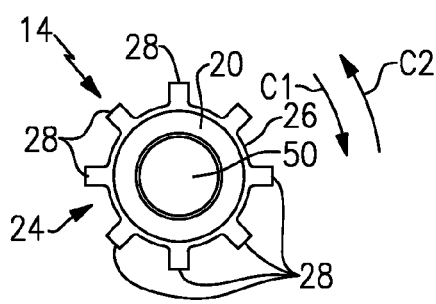
FIG.2C
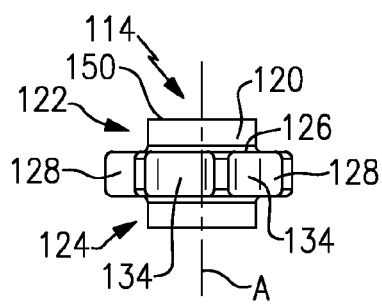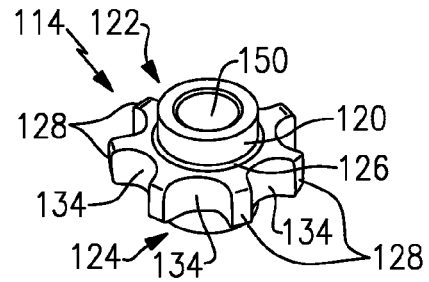
FIG.3A  FIG.3B
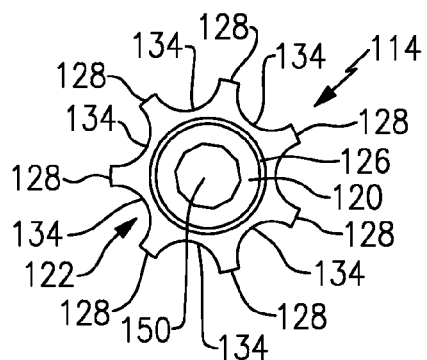
FIG.3C

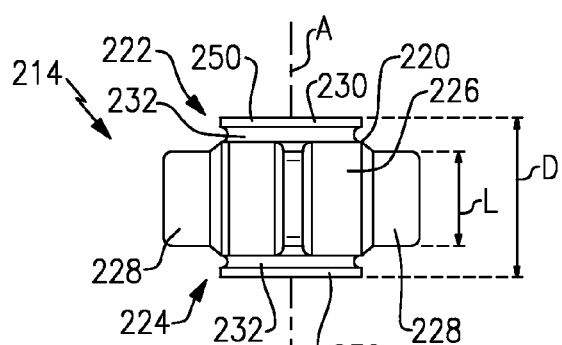
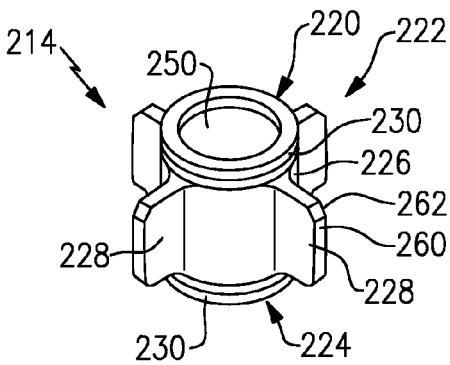
FIG.4A  FIG.4B
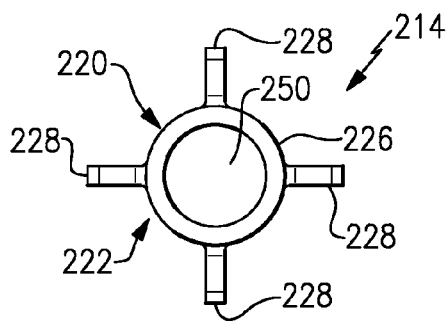
FIG.4C
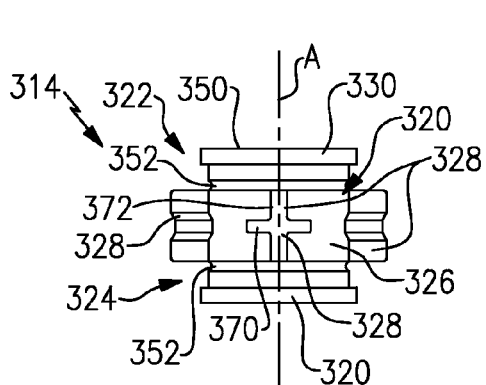
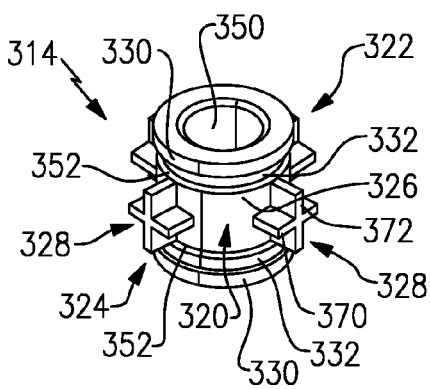
FIG.5A  FIG.5B
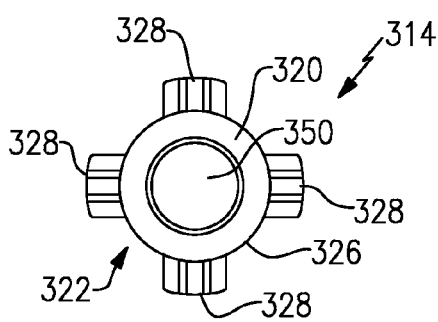
FIG.5C

ANTI-ROTATION AND PULL RESISTANT FASTENER INSERTS

TECHNICAL FIELD

This disclosure relates to a variety of inserts that can be utilized within a fastener assembly for securing objects together. The inserts include anti-rotation and pull-out resistance features designed to improve the integrity of the insert within a substrate of the fastener assembly.

BACKGROUND

Fastener assemblies are used in various industries, including but not limited to the automotive industry, to secure objects together. One known fastener assembly includes a substrate and an insert embedded within the substrate. The insert is configured to accept a fastener for attaching another structure to the substrate. Inserts and the substrates they are housed in are often made of different types of materials, and the substrate are often made of softer materials as compared to the inserts. Therefore, the inserts have a tendency to strip (i.e., rotate within the substrate) and/or pull out of the substrate when a fastener is inserted into the insert and is subsequently torqued or stressed.

SUMMARY

An insert according to an exemplary aspect of the present disclosure includes, among other things, a body extending along an axis between a proximal portion and a distal portion and a plurality of tabs that protrude radially outwardly from an outermost surface of the body at a location between the proximal portion and the distal portion.

In a further non-limiting embodiment of the foregoing insert, the plurality of tabs are circumferentially distributed about the body.

In a further non-limiting embodiment of either of the foregoing inserts, the body is cylindrical.

In a further non-limiting embodiment of any of the foregoing inserts, the plurality of tabs extend vertically in parallel to the axis of the body.

In a further non-limiting embodiment of any of the foregoing inserts, the plurality of tabs include a length that spans an entire distance between the proximal portion and the distal portion.

In a further non-limiting embodiment of any of the foregoing inserts, the plurality of tabs include four tabs distributed every 90° about the outermost surface.

In a further non-limiting embodiment of any of the foregoing inserts, the plurality of tabs are cross-shaped.

In a further non-limiting embodiment of any of the foregoing inserts, a concave surface connects adjacent tabs of the plurality of tabs.

In a further non-limiting embodiment of any of the foregoing inserts, the plurality of tabs includes at least one anchor feature configured to receive a material.

In a further non-limiting embodiment of any of the foregoing inserts, the plurality of tabs are configured as an annular ring and the anchor feature includes a recess formed between an upper ring and a lower ring of the annular ring.

In a further non-limiting embodiment of any of the foregoing inserts, the anchor feature includes an opening formed through each of the plurality of tabs.

In a further non-limiting embodiment of any of the foregoing inserts, the body includes a plurality of flexible legs.

In a further non-limiting embodiment of any of the foregoing inserts, the plurality of tabs are arranged in vertical rows disposed along at least a portion of the plurality of flexible legs, the plurality of tabs of each of the vertical rows extending circumferentially across a width of the portion of the plurality of flexible legs.

In a further non-limiting embodiment of any of the foregoing inserts, a central bore extends through the body and circumscribes the axis.

In a further non-limiting embodiment of any of the foregoing inserts, at least one of the proximal portion and the distal portion includes a lip.

A fastener assembly according to another exemplary aspect of the present disclosure includes, among other things, a substrate and an insert mounted within the substrate, the insert including a body extending between a proximal portion and a distal portion and a plurality of tabs that protrude from the body. The outermost surfaces of the proximal portion and the distal portion are disposed in a first plane and the plurality of tabs extend to a second plane that is radially outward of the first plane.

In a further non-limiting embodiment of the foregoing assembly, the substrate is made of a plastic or composite material and the insert is made of a plastic material.

In a further non-limiting embodiment of either of the foregoing assemblies, the substrate is made of a plastic or composite material and the insert is made of a metallic material.

In a further non-limiting embodiment of any of the foregoing assemblies, the insert is molded into the substrate.

In a further non-limiting embodiment of any of the foregoing assemblies, the fastener assembly is part of a vehicle assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 2A, 2B and 2C illustrate an insert according to a first embodiment of this disclosure.

FIGS. 3A, 3B and 3C illustrate an insert according to a second embodiment of this disclosure.

FIGS. 4A, 4B and 4C illustrate another insert.

FIGS. 5A, 5B and 5C illustrate yet another insert.

DETAILED DESCRIPTION

This disclosure details an insert for use within a fastener assembly. The fastener assembly may be employed in a variety of applications for securing objects together. The insert may include a body extending along a longitudinal axis between a proximal portion and a distal portion. A plurality of tabs protrude radially outwardly from an outermost surface of the body at a location between the proximal portion and the distal portion. The plurality of tabs extend into the surrounding material of the substrate to resist rotation and pull-out of the insert from within the substrate. These and other features are discussed in greater detail in the paragraphs that follow.

Figure 1:
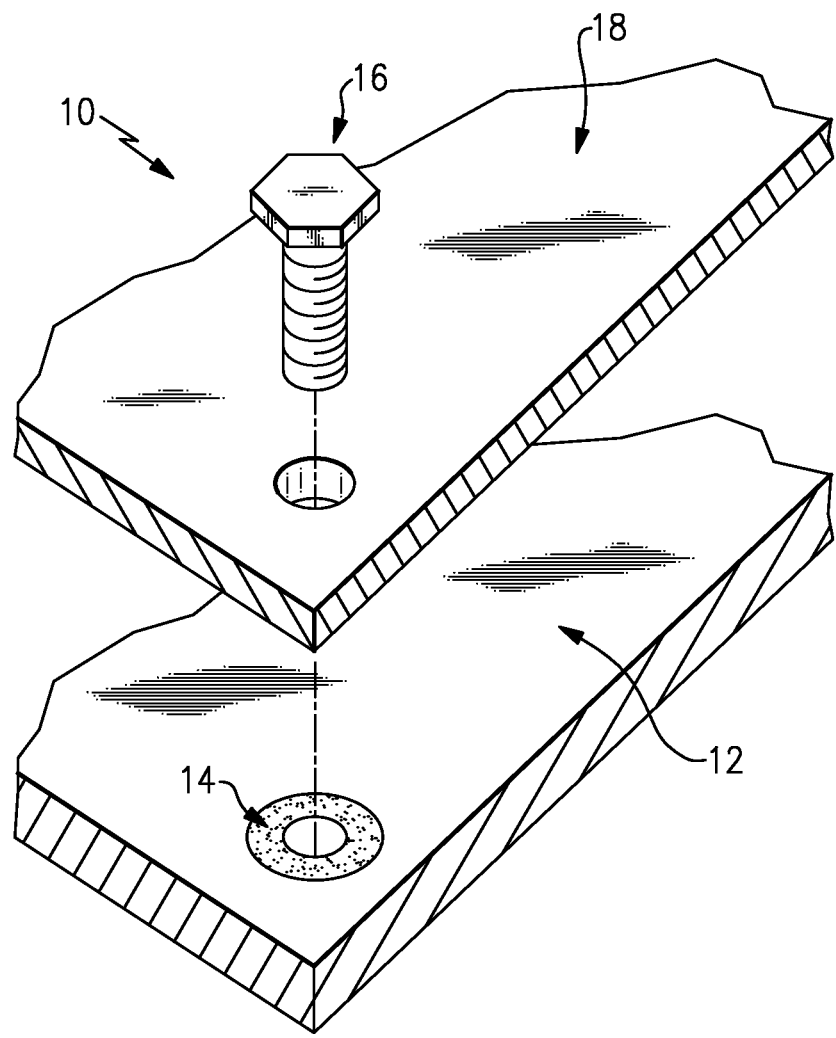
FIG. 1 illustrates a fastener assembly.

FIG. 1 illustrates a fastener assembly 10. The fastener assembly 10 may include a substrate 12 and an insert 14 that is mounted within the substrate 12. In one non-limiting embodiment, the insert 14 is molded into the substrate 12. However, the insert 14 could be mounted to the substrate 12 in any known manner.

The insert 14 is configured to receive a fastener 16 to connect the substrate 12 and a separate structure 18 together. In one non-limiting embodiment, the fastener assembly 10 is part of a vehicle assembly. For example, the fastener assembly 10 could be part of a battery assembly of an electrified vehicle. However, this disclosure is not limited to vehicle assemblies, and could extend to any other industry that may benefit from mechanical connections. Stated another way, the fastener assembly 10 could be used for any industrial application.

The substrate 12 and the insert 14 can be made of similar or dissimilar materials. In one embodiment, the substrate 12 is made of a plastic material. In another embodiment, the substrate 12 is made of a composite material. The insert 14 may be made of plastic or metallic materials. In one non-limiting embodiment, the substrate 12 is made of a material that is generally softer than the material of the insert 14.

The insert 14 may embody a variety of design configurations that resist rotation relative to the substrate 12 and/or resist pull-out of the insert 14 from the substrate 12. Multiple embodiments of inserts are illustrated in FIGS. 2-8, and are further detailed below.

FIGS. 2A, 2B and 2C illustrate an insert 14 according to a first embodiment of this disclosure. The insert 14 includes a body 20 that extends along a longitudinal axis A between a proximal portion 22 and a distal portion 24. In one embodiment, the body 20 is cylindrical. However, other shapes are also contemplated.

A central bore 50 extends through the body 20 of the insert 14 and circumscribes the longitudinal axis A. The central bore 50 is configured to receive a shaft of a fastener (see, for example, fastener 16 of FIG. 1). In one embodiment, the central bore 50 is threaded and may receive a threaded shaft of a fastener.

The body 20 includes an outermost surface 26. In one embodiment, the outermost surface 26 is a circumferential surface. A plurality of tabs 28 extend radially outward of the outermost surface 26 at a location between the proximal portion 22 and the distal portion 24. The tabs 28 may extend any distance from the outermost surface 26. In one embodiment, outermost surfaces of the proximal portion 22 and the distal portion 24 are disposed in a first plane P1 and the tabs 28 extend to a second plane P2 that is radially outward of the first plane P1 (see FIG. 2A).

In one embodiment, the tabs 28 are evenly distributed circumferentially about the outermost surface 26. In the illustrated embodiment, the insert 14 includes a total of eight evenly distributed tabs 28. However, other configurations are also contemplated (see, for example, configurations of FIGS. 3-8).

In one embodiment, the tabs 28 include a length L1 that is less than an overall length L2 of the body 20 from the proximal portion 22 to the distal portion 24. The length L1 of the tabs 28 extends longitudinally in parallel to the axis A. When mounted in the substrate 12 (see FIG. 1), the tabs 28 extend into the material of the substrate 12 to resist rotation in either a clockwise direction C1 or a counter-clockwise direction C2 (see FIG. 2C) and resist pull-out of the insert 14 in directions D1 or D2 (see FIG. 2A).

In another embodiment, the proximal portion 22, the distal portion 24, or both include a lip 30. The lip 30 may facilitate increased pull-out resistance of the insert 14. For example, material from the substrate 12 may be received within an annular slot 32 established by the lip 30 to increase the pull out resistance of the insert 14.

The body 20 of the insert 14 may further include one or more additional annular slots 52 that extend radially inward of the outermost surface 26. In one embodiment, the tabs 28 are disposed between annular slots 52. The annular slots 52 may further facilitate pull-out resistance of the insert 14.

FIGS. 3A, 3B and 3C illustrate another exemplary insert 114. In this disclosure, like reference numbers designate like elements where appropriate and reference numerals with the addition of 100 or multiples thereof designate modified elements that are understood to incorporate the same features and benefits of the corresponding original elements.

The insert 114 includes a body 120 that extends along a longitudinal axis A between a proximal portion 122 and a distal portion 124. A central bore 150 extends through the body 120 of the insert 114 and circumscribes the longitudinal axis A. A plurality of tabs 128 extend radially outwardly from an outermost surface 126 of the body 120. In the illustrated, non-limiting embodiment, the insert 114 includes seven tabs 128 that are equidistantly spaced circumferentially about the outermost surface 126 of the body 120.

In one embodiment, the tabs 128 are configured as a ring of radially protruding tabs that are each connected to one another by concave surfaces 134. Stated another way, the concave surfaces 134 may connect between adjacent tabs 128. The concave surfaces 134 are curved in a direction that faces away from the outermost surface 126 of the body 120, in one embodiment.

FIGS. 4A, 4B and 4C illustrate another insert 214 that provides improved resistance to rotation and pull-out within a substrate. The insert 214 includes a body 220 that extends along a longitudinal axis A between a proximal portion 222 and a distal portion 224. A central bore 250 extends through the body 220 of the insert 214 and circumscribes the longitudinal axis A. A plurality of tabs 228 extend radially outward of an outermost surface 226 of the body 220.

In the illustrated, non-limiting embodiment, a total of four tabs 228 are spaced apart from one another by 90° about the outermost surface 226 of the body 220. The proximal portion 222 and the distal portion 224 may each include lips 230 that establish annular slots 232 disposed on either side of the tabs 228. In one embodiment, the tabs 228 include a length L that spans an entire distance D between the lips 230 of the proximal portion 222 and the distal portion 224 (see FIG. 4A). End surfaces 260 of the tabs 228 may include beveled edges 262 (see FIG. 4B).

Another insert 314 is illustrated in FIGS. 5A, 5B and 5C. The insert 314 includes a body 320 that extends along a longitudinal axis A between a proximal portion 322 and a distal portion 324. A central bore 350 extends through the body 320 of the insert 314 and circumscribes the longitudinal axis A. A plurality of tabs 328 extend radially outward of an outermost surface 326 of the body 320.

In the illustrated, non-limiting embodiment, the tabs 328 are equally distributed circumferentially about the outermost surface 326. The tabs 328 are cross shaped, in one non-limiting embodiment, and may each include a horizontal portion 370 and a vertical portion 372.

The proximal portion 322 and the distal portion 324 may include lips 330. The lips 330 form annular slots 332 to increase the pull out resistance of the insert 314. Additional annular slots 352 extend radially inward of the outermost surface 326. In one embodiment, the tabs 328 are disposed longitudinally between the annular slots 352.

Figure 6A:
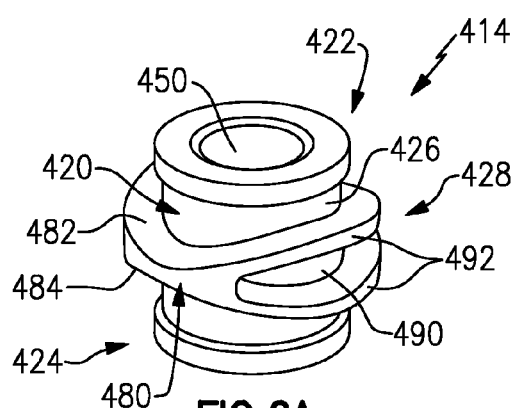
FIGS. 6A, 6B and 6C illustrate an insert according to yet another embodiment of this disclosure.
Figure 6B:
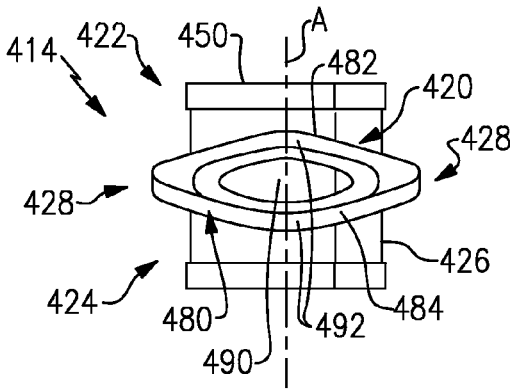
Figure 6C:
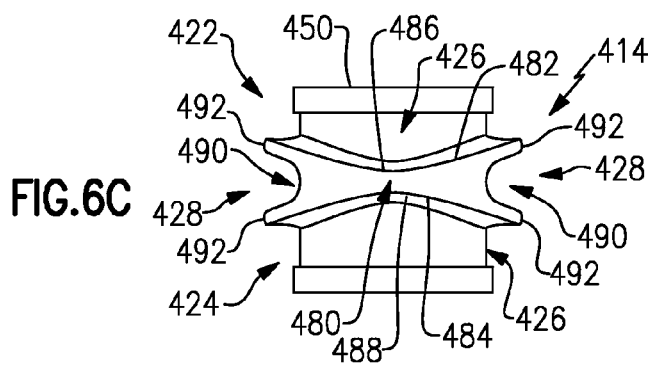

FIGS. 6A, 6B and 6C illustrate another insert 414. The insert 414 includes a body 420 that extends along an axis A between a proximal portion 422 and a distal portion 424. A central bore 450 extends through the body 420 of the insert 414 and circumscribes the longitudinal axis A. Tabs 428 extend radially outward of an outermost surface 426 of the body 420.

In the illustrated, non-limiting embodiment, the tabs 428 are configured as an annular ring 480 that surrounds the outermost surface 426. The annular ring 480 may include an upper ring 482 and a lower ring 484. In one embodiment, the upper ring 482 defines a concave surface 486 and the lower ring 484 defines a convex surface 488 (see FIG. 6C). Recesses 490 may be formed between outer lips 492 of the upper ring 482 and the lower ring 484. In one embodiment, the outer lips 492 are located where the concave surface 486 and the convex surface 488 are diverged from one another by the greatest distance. The recesses 490, which may be oval-shaped, act as anchor features that can receive material of a substrate to increase the pull-out and torque resistance of the insert 414. For example, material of the substrate may be molded inside the recesses 490 during formation of a fastener assembly to maximize pull-out and torque resistance of the insert 414.

Figure 7A:
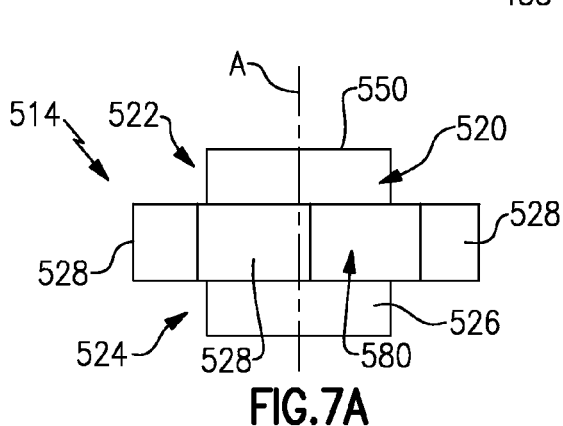
FIGS. 7A, 7B and 7C illustrate yet another insert.
Figure 7B:
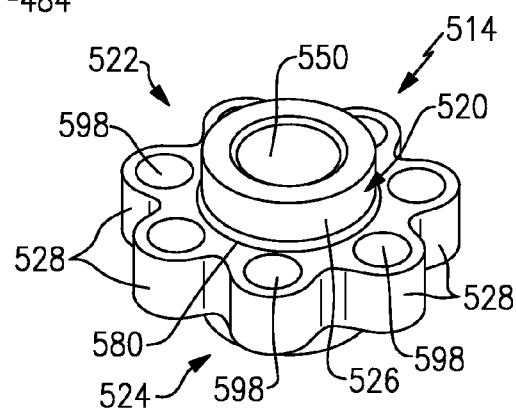
Figure 7C:
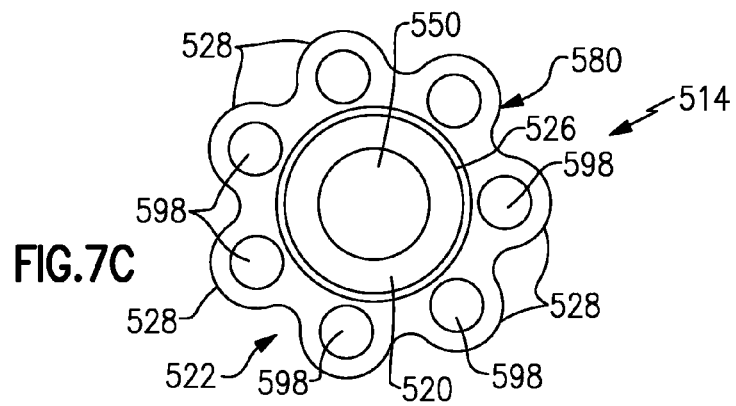

FIGS. 7A, 7B and 7C illustrate another exemplary insert 514. The insert 514 includes a body 520 that extends along an axis A between a proximal portion 522 and a distal portion 524. A central bore 550 extends through the body 520 of the insert 514 and circumscribes the longitudinal axis A. Tabs 528 extend radially outward of an outermost surface 526 of the body 520.

In the illustrated, non-limiting embodiment, the tabs 528 are configured as an annular ring 580 that circumscribes the outermost surface 526. Each tab 528 includes an opening 598 that extends through the annular ring 580. The openings 598 act as anchor features that can receive material of a substrate to increase the pull-out and torque resistance of the insert 514. For example, material of the substrate may be molded inside the openings 598 during formation of a fastener assembly to maximize pull-out and torque resistance of the insert 514.

Figure 8A:
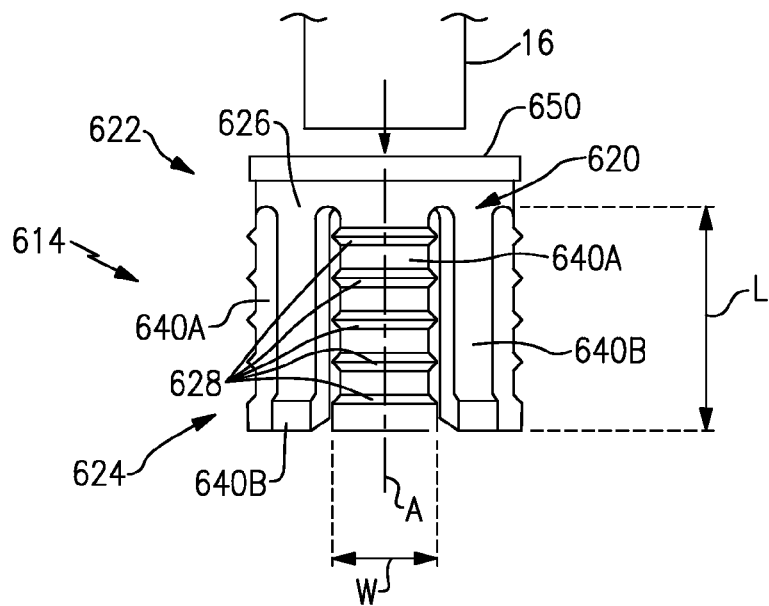
FIGS. 8A, 8B and 8C illustrate an insert according to another embodiment of this disclosure.
Figure 8B:
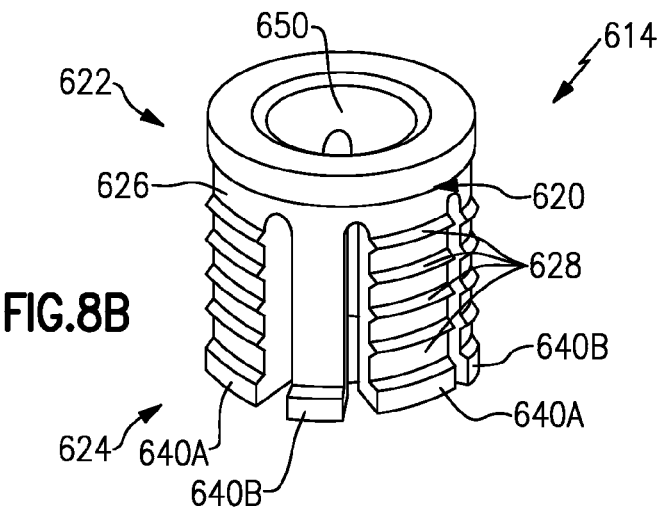
Figure 8C:
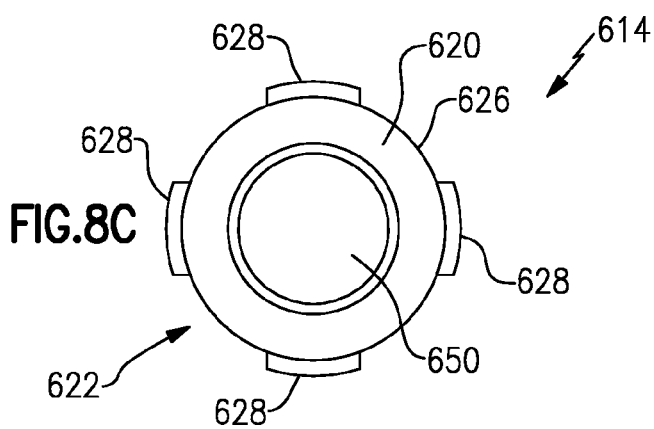

An insert 614 according to another embodiment of this disclosure is illustrated in FIGS. 8A, 8B and 8C. The exemplary insert 614 includes a body 620 that extends along an axis A between a proximal portion 622 and a distal portion 624. A central bore 650 extends through the body 620 of the insert 614 and circumscribes the axis A. The body 620 includes an outermost surface 626. A plurality of tabs 628 extend radially outwardly from the outermost surface 626.

The body 620 may include a first plurality of legs 640A and a second plurality of legs 640B that extend in parallel to the axis A. The legs 640A and the legs 640 may be disposed in an alternating pattern about the body 620 (i.e., a leg 640A, a leg 640B, another leg 640A, and so on). In one embodiment, the first plurality of legs 640 include tabs 628 and the second plurality of legs 640B lack any tabs 628. In other words, in one embodiment, the tabs 628 are disposed on every other leg of the body 620.

In one non-limiting embodiment, the tabs 628 are arranged in a vertically extending row along a length L of each leg 640A. Each tab 628 may extend circumferentially across a width W of each leg 640A (see FIG. 8A).

In another embodiment, the legs 640A and the legs 640B are both flexible. For example, the legs 640A and the legs 640B may expand radially outwardly into a surrounding material of a substrate as a fastener 16 (see FIG. 8A) is inserted through the central bore 650 of the insert 614, thereby increasing pull-out and torque resistance of the insert 614.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An insert, comprising:
a body extending along an axis between a proximal portion and a distal portion;
a plurality of tabs that protrude radially outwardly from an outermost surface of said body at a location between said proximal portion and said distal portion;
said plurality of tabs including at least one anchor feature configured to receive a material; and
said plurality of tabs are configured as an annular ring and said anchor feature includes a recess formed between an upper ring and a lower ring of said annular ring.

2. An insert, comprising:
a body extending along an axis between a proximal portion and a distal portion;
a plurality of tabs that protrude radially outwardly from an outermost surface of said body at a location between said proximal portion and said distal portion;
said plurality of tabs including at least one anchor feature configured to receive a material; and
said anchor feature includes an opening formed through each of said plurality of tabs.

* * * * *